(12) United States Patent
Alexander et al.

(10) Patent No.: US 12,439,933 B2
(45) Date of Patent: Oct. 14, 2025

(54) FAT FORMULATIONS

(71) Applicant: Savor Foods Limited, San Jose, CA (US)

(72) Inventors: Kathleen Alexander, San Jose, CA (US); Ian Salmon McKay, San Jose, CA (US); Nikifar Lazouski, San Jose, CA (US); Aleesha Slattengren, San Jose, CA (US)

(73) Assignee: Savor Foods Limited, San Jose, CA (US)

( * ) Notice: Subject to any disclaimer, the term of this patent is extended or adjusted under 35 U.S.C. 154(b) by 0 days.

(21) Appl. No.: 18/619,539

(22) Filed: Mar. 28, 2024

(65) Prior Publication Data

US 2024/0237667 A1     Jul. 18, 2024

Related U.S. Application Data

(62) Division of application No. 18/210,226, filed on Jun. 15, 2023, now Pat. No. 11,968,994.

(60) Provisional application No. 63/352,971, filed on Jun. 16, 2022.

(51) Int. Cl.
    *A23D 9/00*           (2006.01)
    *A23D 9/02*           (2006.01)

(52) U.S. Cl.
    CPC ........... *A23D 9/00* (2013.01); *A23D 9/02* (2013.01)

(58) Field of Classification Search
    CPC .................................. A23D 9/00; A23D 9/02
    USPC ........................................................ 426/607
    See application file for complete search history.

(56) References Cited

U.S. PATENT DOCUMENTS

| | | | |
|---|---|---|---|
| 2,835,691 A | | 5/1958 | Sauter |
| 3,006,771 A | * | 10/1961 | Babayan ............... A23D 7/001 |
| | | | 426/607 |
| 5,258,197 A | | 11/1993 | Wheeler et al. |
| 5,378,490 A | | 1/1995 | Wheeler et al. |
| 5,380,544 A | | 1/1995 | Klemann et al. |
| 5,395,629 A | | 3/1995 | Bertoli et al. |
| 5,411,756 A | | 5/1995 | Wheeler et al. |
| 5,456,939 A | | 10/1995 | Wheeler et al. |
| 5,492,714 A | | 2/1996 | Guskey et al. |

(Continued)

FOREIGN PATENT DOCUMENTS

| | | |
|---|---|---|
| WO | 9315612 A1 | 8/1993 |
| WO | 2021255198 A1 | 12/2021 |
| WO | 2023163639 A1 | 8/2023 |

OTHER PUBLICATIONS

Bremt et al, Balancing functional and nutritional quality of oils and fats: Current requirements and future trends; Dossier: Fonctionnalités des huiles (2012).*

(Continued)

*Primary Examiner* — Brent T O'Hern
(74) *Attorney, Agent, or Firm* — Jeffrey Schox; Randy Mehlenbacher

(57) ABSTRACT

An animal fat functional analogue (e.g., mimic) can include a gapped formulation of interesterified triglycerides that include saturated fatty acids. The animal fat functional analogue can have thermal properties (e.g., melting point, solid fat content, specific heat, etc.), rheological properties (e.g., viscosity), organoleptic properties (e.g., texture, mouthfeel, etc.), and/or other properties that imitate the properties of animal fat produced agriculturally.

7 Claims, 7 Drawing Sheets

(56) References Cited

U.S. PATENT DOCUMENTS

| | | | |
|---|---|---|---|
| 5,552,174 | A | 9/1996 | Wheeler et al. |
| 5,565,232 | A | 10/1996 | Wheeler et al. |
| 5,645,881 | A | 7/1997 | Tancibok et al. |
| 5,662,953 | A | 9/1997 | Wheeler et al. |
| 6,162,483 | A | 12/2000 | Wester |
| 7,582,317 | B2 | 9/2009 | Barclay et al. |
| 7,637,968 | B2 | 12/2009 | Murphy |
| 7,645,473 | B2 | 1/2010 | Herzing et al. |
| 9,034,612 | B2 | 5/2015 | Lam et al. |
| 9,332,771 | B2 | 5/2016 | Shulman et al. |
| 9,849,071 | B2 | 12/2017 | Fack et al. |
| 10,004,247 | B2 | 6/2018 | Shulman et al. |
| 11,292,989 | B2 | 4/2022 | Oonishi et al. |
| 2002/0001660 | A1 | 1/2002 | Takeuchi et al. |
| 2003/0143313 | A1 | 7/2003 | Ikuina et al. |
| 2008/0190160 | A1 | 8/2008 | Tran et al. |
| 2008/0193624 | A1 | 8/2008 | Shulman et al. |
| 2013/0252405 | A1 | 9/2013 | Li et al. |
| 2015/0266802 | A1 | 9/2015 | Balakrishnan et al. |
| 2016/0133843 | A1 | 5/2016 | Rogers et al. |
| 2016/0227810 | A1 | 8/2016 | Akoh et al. |
| 2020/0045991 | A1 | 2/2020 | Watanabe et al. |
| 2020/0078464 | A1 | 3/2020 | Senanayake et al. |
| 2020/0332223 | A1 | 10/2020 | Chen et al. |
| 2021/0324301 | A1 | 10/2021 | Lorén et al. |
| 2022/0211066 | A1 | 7/2022 | Wang et al. |
| 2023/0404101 | A1 | 12/2023 | Alexander et al. |

OTHER PUBLICATIONS

"MCT Oil-26154", Available online at https://rightpathind.com/wp-contenUuploads/2019/08/Technical-Sheet-26154-1.pdf on Aug. 2019 (Year: 2019).

Martinez Garcia, et al., "Synthetic fat from petroleum as a resilient food for global catastrophes: preliminary techno-economic w assessment and technology roadmap", Chemical Engineering Research and Design, vol. 177, Jan. 2022, pp. 255-272. (Year: 2022).

Roopashree, et al., "Effect of medium chain fatty acid in human health and disease", Journal of Functional foods 87 (2021 ). (Year: 2021).

Verruck, et al., "Dairy foods and positive impact on the consumer's health".

Webster, et al., "The Basics of MCT Oil", Available online at https://foodinsight.org/the-basics-of-mct-oil/ on Nov. 6, 2020. (Year: 2020).

Whitmore, "Organic Chemistry", 2nd Edition (1951). Dover Publications Inc. p. 256. (Year: 1951).

Wikipedia, "Paraffin oxidation", Oct. 8, 2021 retrieved on Oct. 16, 2023 from https://en.wikipedia.org/w/index.php?title=Paraffin_oxidation&oldid=1048922553; entire document, especially p. 1 para 1.

"Handbook of Milk of Non-Bovine Mammals", Editor(s):Young W. Park, George F.W. Haenlein, First published:Jan. 13, 2006, Print ISBN:9780813820514, Online ISBN:9780470999738, DOI:10.1002/9780470999738.

"Neobee Medium Chain Triglycerides Brochure", Food Nutrition Pharmaceuticals, Stephan Lipid Nutrition, https://www.stepan.com/content/dam/stepan-dot-com/webdam/website-product-documents/literature/food-nutrition-pharmaceutical/NEOBEEBrochure.pdf, first downloaded Dec. 13, 2023.

"Oils—Melting points", The Engineering ToolBox (2008). Oils—Melting points. [online] Available at: https://www.engineeringtoolbox.com/oil-melting-point-d_1088.html [Accessed Day Month Year].

"Product Development of Cheese", Green-On Blog, Nov. 16, 2023.

"Product Development of Cookie Filling", Green-On Blog, https://www.green-on.se/product-development-cookie-filling/, Nov. 8, 2023.

"Stepan 108", Industrial Lubricants and Additives Product Bulletin, Stepan, Dec. 2011.

"The Lipid Handbook", Third Edition-CRC Press (2007), Taylor & Francis Group, 6000 Broken Sound Parkway NW, Suite 300 Boca Raton, FL 33487-2742.

Andrei, Mihai, et al., "Scientists figure out a way to add fat to lab-grown meat", ZME Science, Nov. 18, 2021 in Future, News, Nutrition.

Artz, W.E., et al., "Reduced and zero calorie lipids in food", Modifying Lipids for Use in Food, Woodhead Publishing Series in Food Science, Technology and Nutrition, Sep. 2006, pp. 444-461.

Bhattacharya, K., et al., "Speciality oils and their applications in food", Modifying Lipids for Use in Food, Woodhead Publishing Series in Food Science, Technology and Nutrition, Sep. 2006, pp. 539-566.

Changade, S.P., et al., "Physical Proporties of Ghee Prepared From High Acidic Milk-II", J. Dairying, Foods & H.S.25 (2) : 101-104, 2006.

Clulow, Andrew J., et al., "Milk mimicry—Triglyceride mixtures that mimic lipid structuring during the digestion of bovine and human milk", Food Hydrocolloids 110 (2021) 106126.

De Graef, Veerie, et al., "Effect of TAG composition on the solid fat content profile, microstructure, and hardness of model fat blends with identical saturated fatty acid content", Eur. J. Lipid Sci. Technol. 2012, 000, 0000-0000.

Dreher, Johannes, et al., "Formation and characterization of plant-based emulsified and crosslinked fat crystal networks to mimic animal fat tissue", Journal of Food Science, vol. 85, Iss. 2, 2020.

Dreher, Johannes, et al., "Influence of protein content on plant-based emulsified and crosslinked fat crystal networks to mimic animal fat tissue", Food Hydrocolloids 106 (2020) 105864.

Hammond, E., et al., "Filled and artificial dairy products and altered milk fats", Modifying Lipids for Use in Food, Woodhead Publishing Series in Food Science, Technology and Nutrition, Sep. 2006, pp. 462-487.

Knothe, Gerhard, et al., "A Comprehensive Evaluation of the Melting Points of Fatty Acids and Esters Determined by Differential Scanning Calorimetry", Journal of the American Oil Chemists' Society, Sep. 2009.

Legrand, Philippe, et al., "The Complex and Important Cellular and Metabolic Functions of Saturated Fatty Acids", Lipids (2010) 45:941-946.

Lindsten, Per Olof, "Swedish chemists make food from electricity and carbon dioxide", Power to Food, Mar. 16, 2021.

Marquez, Andres L., et al., "Solid Fat Content Estimation by Differential Scanning Calorimetry: Prior Treatment and Proposed Correction", J Am Oil Chem Soc (2013) 90:467-473.

Martini, S., et al., "Structure and properties of fat crystal networks", Modifying Lipids for Use in Food, Woodhead Publishing Series in Food Science, Technology and Nutrition, Sep. 2006, pp. 142-169.

Masterjohn, Christopher, "Fatty Acid Analysis of Grass-fed and Grain-fed Beef Tallow", The Weston A. Price Foundation, Jan. 21, 2014, https://www.westonaprice.org/author/cmasterjo/.

Norberg, S., et al., "Chocolate and confectionery fats", Modifying Lipids for Use in Food, Woodhead Publishing Series in Food Science, Technology and Nutrition, 2006, pp. 488-516.

Ranjith, H.M. Premlal, et al., "Lipid emulsifiers and surfactants in dairy and bakery product", Modifying Lipids for Use in Food, Woodhead Publishing Series in Food Science, Technology and Nutrition, Sep. 2006, pp. 393-428.

Rubini, Milton E., "Filled Milk and Artificial Milk Substitutes", The American Journal of Clinical Nutrition, vol. 22, No. 2, Feb. 1969, pp. 163-167.

Scheeder, M. R. L., et al., "Modifying fats of animal origin for use in food", Modifying Lipids for Use in Food, Woodhead Publishing Series in Food Science, Technology and Nutrition, Sep. 2006, pp. 306-335.

Slattengren, Aleesha, et al., "Milkfat or Butterfat Formulations", U.S. Appl. No. 18,428,575, filed Jan. 31, 2024.

Sokolenko, G.G., et al., "Application of artificial substitutes of dairy fat", Vopr Pitan. 2012;81(6):80-3.

Southey, Flora, "Givaudan mimics animal fat cells with encapsulated coconut oil to 'reduce high fat content while improving juiciness' in plant-based", https://www.foodnavigator-usa.com, Feb. 22, 2022.

Van Erp, Harrie, et al., "Engineering the stereoisomeric structure of seed oil to mimic human milk fat", PNAS, Oct. 15, 2019, vol. 116, No. 42, 20947-20952.

(56) References Cited

OTHER PUBLICATIONS

Wei, Wei, et al., "Human milk fat substitutes: Past achievements and current trends", Progress in Lipid Research 74 (2019) 69-86.

Xu, X., et al., "Chemical and enzymatic interesterification of lipids for use in food", Modifying Lipids for Use in Food, Woodhead Publishing Series in Food Science, Technology and Nutrition, Sep. 2006, pp. 234-272.

"Lipids: Fats, Oils, Waxes, etc.", Internet Archive Wayback Machine, lipids.htm, Mar. 26, 2015.

"Milk Facts", Milk Fats Info, http://www.milkfacts.info/Milk%20Composition/Fat.htm#:~:text=components%20of%20hormones.-,Milk%20Fat%20Chemistry,90%25%20of%20the%20milk%20fat., first downloaded Nov. 22, 2024.

Deffense, E., "Milk Fat Fractionation Today: A Review", American Oil Chemists' Society, vol. 70, No. 12 (Dec. 1993).

Fernando, S., et al., "Lubricity Characteristics of Selected Vegetable Oils, Animal Fats, and Their Derivatives", Applied Engineering in Agriculture, vol. 23(1): 5-11, Jan. 2007.

Meyer-Doring, Hans Heinrich, et al., "Is It Safe To Use Synthetic Fatty Acids for Food Purposes?", Klin Wochenschr 27, 113-116 (1949). https://doi.org/10.1007/BF01471275. Feb. 15, 1949.

Pratama, Yoga, et al., "Decoding the role of triacylglycerol composition in the milk fat crystallisation behaviour: A study using buffalo milk fat fractions", LWT—Food Science and Technology 186 (2023) 115274.

Schreppler, Sydney, et al., "Fat Composition and Relationship with Free Fatty Acid Distribution", U.S. Appl. No. 18/974,401, filed Dec. 9, 2024.

Slattengren, Aleesha, et al., "Liquid or Semi-Solid Fat Formulations", U.S. Appl. No. 18/818,047, filed Aug. 28, 2024.

Venn-Watson, Stephanie, et al., "Efficacy of dietary odd-chain saturated fatty acid pentadecanoic acid parallels broad associated health benefits in humans: could it be essential?", Scientific Reports, May 2020, 10(1).

"Butterfat", Wikipedia, https://en.wikipedia.org/wiki/Butterfat, first downloaded Dec. 13, 2023.

"Caprenin", Wikipedia, https://en.wikipedia.org/wiki/Caprenin, first downloaded Dec. 13, 2023.

Ediriweera, et al., "Odd-chain fatty acids as novel histone deacetylase 6 (HDAC6) inhibitors", Biochimie 186 (2021) 147-156. (Year: 2021).

Gao, et al., "Isolation and identification of C-19 fatty acids with anti-tumor activity from the spores of Ganoderma lucidum (reishi mushroom)", Fitoterapia 83 (2012) 490-499. (Year: 2012).

Senyilmaz-Tiebe, et al., "Dietary stearic acid regulates mitochondria in vivo in humans", Naturae Communications (2018) 9:3129. (Year: 2018).

Venn-Watson, et al., "Increased dietary intake of saturated fatty acid heptadecanoic acid (C17:0) associated with decreasing ferritin and alleviated metabolic syndrome in dolphins", PLOS One Jul. 22, 2015. (Year: 2015).

Labarther, et al., "Medium-chain Fatty Acids as Metabolic Therapy in Cardiac Disease", Cardiovasc Drugs Ther (2008) 22:97-106, DOI 10.1007/510557-008-6084-0.

\* cited by examiner

Carbon chain length

Carbon chain length

Carbon chain length

| C8:0 | C9:0 | C10:0 | C11:0 | C12:0 | C13:0 | C14:0 | C15:0 | C16:0 | C17:0 | C18:0 | C19:0 | C20:0 |
|---|---|---|---|---|---|---|---|---|---|---|---|---|
| 7.5% | 7.5% | 12.5% | 12.5% | 0 | 0 | 25% | 25% | 5% | 5% | 0 | 0 | 0 |
| 8% | 8% | 10% | 10% | 10% | 10% | 11% | 11% | 11% | 11% | 0 | 0 | 0 |
| 6% | 6% | 16% | 16% | 5% | 5% | 0 | 0 | 23% | 23% | 0 | 0 | 0 |
| 5% | 5% | 15% | 15% | 0 | 0 | 10% | 10% | 20% | 20% | 0 | 0 | 0 |
| 14% | 14% | 0 | 0 | 4% | 4% | 18% | 18% | 14% | 14% | 0 | 0 | 0 |
| 0 | 0 | 15% | 15% | 5% | 5% | 5% | 5% | 10% | 10% | 10% | 10% | 10% |
| 2.5% | 2.5% | 17.5% | 17.5% | 5% | 5% | 0 | 0 | 15% | 15% | 7.5% | 7.5% | 5% |
| 15% | 0 | 25% | 0 | 0 | 0 | 50% | 0 | 10% | 0 | 0 | 0 | 0 |
| 10% | 0 | 30% | 0 | 0 | 0 | 20% | 0 | 40% | 0 | 0 | 0 | 0 |
| 40% | 0 | 0 | 0 | 0 | 0 | 0 | 0 | 60% | 0 | 0 | 0 | 0 |

FAT FORMULATIONS

CROSS-REFERENCE TO RELATED APPLICATIONS

This application is a divisional of U.S. patent application Ser. No. 18/210,226, filed 15 Jun. 2023 which claims the benefit of U.S. Provisional Application No. 63/352,971, filed 16 Jun. 2022, each of which is incorporated in its entirety by this reference.

TECHNICAL FIELD

This invention relates generally to the substitute fat field, and more specifically to a new and useful system and method in the substitute fat field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
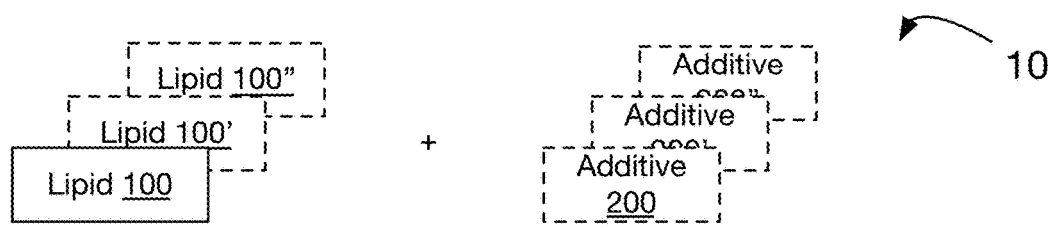
FIG. 1 is a schematic representation of a formulation.

As shown in FIG. 1, the formulation 10 can include one or more lipids 100, 100', 100" (where 100, 100', and/or 100" can be the same and/or different such as selected from the same and/or different distribution, include the same and/or different fatty acid constituents, etc.) and optionally one or more additives 200, 200', 200" (where 200, 200', and/or 200" can be the same and/or different such as for the same purpose, selected from the same group of materials, etc.). The formulation can be, for instance, an agriculture-free (e.g., does not include materials derived from agricultural products, includes materials derived from chemical processing, etc.), an agriculture light (e.g., less than about 10% by mass, by volume, by stoichiometry, etc. of the composition can be derived from agricultural products), animal-free (e.g., does not include materials derived from animal products or byproducts, does not include fatty acids derived from animal products or byproducts, etc.), animal light (e.g., includes less than about 10% by mass, by volume, by stoichiometry, etc. materials derived from animal products or byproducts; includes less than about 10% by mass, by volume, by stoichiometry, etc. fatty acids derived from animal products or byproducts; etc.), plant-free (e.g., does not include materials derived from plant products or byproducts, does not include fatty acids derived from plant products or byproducts, etc.), plant-light (e.g., includes less than about 10% by mass, by volume, by stoichiometry, etc. materials derived from plant products or byproducts; includes less than about 10% by mass, by volume, by stoichiometry, etc. fatty acids derived from plant products or byproducts; etc.), eco-conscious (e.g., includes materials that are sustainable, low carbon foot print such as less than about 10 kg $CO_2$ emitted per kg of products produced, low ecological footprint, local materials or derived from local materials or foodstuffs, etc.), and/or any suitable formulation.

The formulation can be used, for example, as a fat in food products (e.g., as a nutritional supplement such as for baby formula, for nutritional bars, for drinks, etc.; a performance additive such as for stabilizing nut butters, seed butters, etc.; etc.), a baking or cooking oil (e.g., frying oil such as for French fries, meat products, vegetables, party items, etc.; fat for baked goods, confections, chocolate, etc.; cooking spray or otherwise prepare a nonstick or low-stick cooking or baking surface; etc.), sauces (e.g., dips, dressings, condiments, etc.), a soap, a lubricant, a surfactant, detergent, emulsifier, texturizing agent, wetting agent, anti-foaming agent, stabilizing agent, emollient, metal working fluid, water treatment, varnish or other surface treatment, in personal care or cosmetic products (e.g., in lip balm, lotion, etc.), and/or can be used for any suitable purpose. For example, the formulation can be a food grade (e.g., generally recognized as safe (GRAS) for consumption) fat replacement for one or more of the following fats: lard (e.g., leaf lard), tallow (e.g., beef tallow, mutton tallow, lamb tallow, bison tallow, etc.), tail fat, poultry fat (e.g., duck fat, goose fat, chicken fat, turkey fat, foie gras, etc.), schmaltz (e.g., clarified chicken fat, clarified goose fat, clarified duck fat, etc.), dripping (e.g., beef dripping, pork dripping, etc.), suet, fish oil (e.g., sardine oil, herring oil, anchovy oil, salmon oil, trout oil, tuna oil, swordfish oil, mackerel oil, cod liver oil, shark liver oil, etc.), blubber (e.g., whale fat, seal fat, etc.), Bovidae fat (e.g., bison fat, water buffalo fat, cattle fat, yak fat), Camelidae fat (e.g., dromedary fat, llama fat, etc.), Capra fat (e.g., goat fat, goat milkfat, etc.), Cervidae fat (e.g., elk fat, fallow deer fat, moose fat, red deer fat, reindeer fat, white-tailed deer fat, etc.), Equidae fat (e.g., donkey fat, horse fat, etc.), Lagomorph fat (e.g., rabbit fat), Macropodidae fat (e.g., kangaroo fat), Ovis fat (e.g., sheep fat, lamb fat, mutton fat, sheep milkfat, etc.), Suidae fat (e.g., pig fat, boar fat, etc.), amphibian fat (e.g., frog fat, salamander fat, etc.), bird fat (e.g., chicken fat, duck fat, goose fat, turkey fat, quail fat, pigeon fat, guineafowl fat, ostrich fat, emu fat, peacock fat, egg fat, etc.), crustacean fat (e.g., crayfish fat, crab fat, lobster fat, shrimp fat, prawn fat, etc.), mollusk fat (e.g., oyster fat, mussel fat snail fat, abalone fat, etc.), reptile fat (e.g., alligator fat, crocodile fat, turtle fat, etc.), game fat (e.g., bushmeat fat, antelope fat, porcupine fat, cane rat fat, elephant fat, snake fat, rattle snake fat, caribou fat, hare fat, opossum fat, bear fat, deer fat, etc.), simian fat, canine fat, feline fat, shortening, milkfat or butterfat (e.g., cow milk, goat milk, sheep milk, yak milk, buffalo milk, etc. such as for milk, cream, hard cheese, soft cheese, spreadable cheese, melting cheese, processed cheese, vegan cheese, etc.), ghee (e.g., clarified butter), intramuscular fat or marbling replacement (e.g., for beef, for pork, for buffalo, for mutton, for sheep, for veal, for goat, for yak, for poultry, etc.), intermuscular fat replacement (e.g., for beef, for pork, for buffalo, for mutton, for sheep, for veal, for goat, for yak, for poultry, etc.), subcutaneous fat replacement (e.g., for beef, for pork, for buffalo, for mutton, for sheep, for veal, for goat, for yak, for poultry, etc.), vegetable oil (e.g., coconut oil, coconut butter, coconut milk, coconut cream, palm oil, palm kernel oil, mango butter, Borneo tallow, seed oils, nut oils, coffee oil, tea tree oil, etc.), and/or for any suitable fat replacement (e.g., a vegan fat replacement, a vegetarian fat replacement, a kosher fat replacement, a halal fat replacement, a vegan animal fat mimic, a vegetarian animal fat mimic, a kosher animal fat mimic such as a substitute for pork fat that is kosher, a halal animal fat mimic such as a substitute for pork fat that is halal, etc.).

2. Benefits

Variations of the technology can confer several benefits and/or advantages.

First, variants of the technology can enable lower carbon footprint and/or carbon impact fats to be used. For instance, by using lipids (e.g., free fatty acids, esterified fatty acids, glycerolipids, etc.) derived from low or negative carbon footprint processes (e.g., processes that capture, trap, etc. carbon and convert the carbon to fatty acids, fatty esters, etc.), a low carbon footprint fat can be produced. In some aspects of the invention, a carbon footprint to produce a fat or formulation can be less than a carbon footprint for an identical or analogous fat derived from agricultural processes. In some variations of the invention, using odd chain length fatty acids (in addition to or alternatively from) even chain length fatty acids can help lower a carbon footprint of the formulation (e.g., by reducing a total number of processing steps to prepare the fatty acids, by reducing an amount of waste, etc.).

Second, variants of the technology can produce performant fat formulations that accurately, convincingly, and/or otherwise mimic properties of a fat to be replicated. For example, the fat formulations can have a similar mouthfeel, texture, melting point, smoke point, taste, and/or other suitable property(s) compared to the fat to be replicated. In some variations, using a gapped formulation (e.g., using a combination of fatty acids where at least one intermediate carbon chain length is absent) can enable and/or be beneficial for achieving complex formulation behavior (e.g., more able to mimic a behavior of a fat to be replicated; thermal behavior that is broader, includes larger derivatives or higher order derivatives with respect to temperature, etc.; etc.).

Third, the inventors have identified that using plant-based fats (such as coconut oil, formulations combining plant fats, etc.) to replace, mimic, simulate, and/or otherwise act as an animal fat can provide poor performance (e.g., inauthentic mouthfeel, inauthentic texture, inauthentic melting behavior, etc.). The inventors have found that formulations (e.g., gapped formulations) using saturated fats can, in some variants, produce more performant (e.g., more convincing, closer to the original, etc.) fat replicas (e.g., fat replica, fat analogue, fat replacement, fat mimic, fat impersonation, fat imitation, fat aper, etc.) than plant-based oils or fats.

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, of a reference).

3. Formulation

As shown in FIG. 1, the formulation can include one or more lipids and optionally one or more additives. The formulation can be, for instance, an agriculture-free (e.g., does not include materials derived from agricultural products, includes materials derived from chemical processing, etc.), an agriculture light (e.g., less than about 10% by mass, by volume, by stoichiometry, etc. of the composition can be derived from agricultural products), animal-free (e.g., does not include materials derived from animal products or byproducts, does not include fatty acids derived from animal products or byproducts, etc.), animal light (e.g., includes less than about 10% by mass, by volume, by stoichiometry, etc. materials derived from animal products or byproducts; includes less than about 10% by mass, by volume, by stoichiometry, etc. fatty acids derived from animal products or byproducts; etc.), plant-free (e.g., does not include materials derived from plant products or byproducts, does not include fatty acids derived from plant products or byproducts, etc.), plant-light (e.g., includes less than about 10% by mass, by volume, by stoichiometry, etc. materials derived from plant products or byproducts; includes less than about 10% by mass, by volume, by stoichiometry, etc. fatty acids derived from plant products or byproducts; etc.), eco-conscious (e.g., includes materials that are sustainable, low carbon foot print such as less than about 5 kg $CO_2$ emitted per kg of consumed material, low ecological footprint, local materials or derived from local materials or foodstuffs, etc.), and/or any suitable formulation.

The formulation can be used in edible materials or food products (e.g., GRAS certified formulation, cooking oil, baking oil, frying oil, in fake meats, etc.), soaps, cosmetics, lubricants, surfactants (and/or co-surfactants), detergents, emulsifiers, texturizers, wetting agents, anti-foaming agents, stabilizers, emollients, and/or can be used for any suitable application(s).

Figures 8, 9:
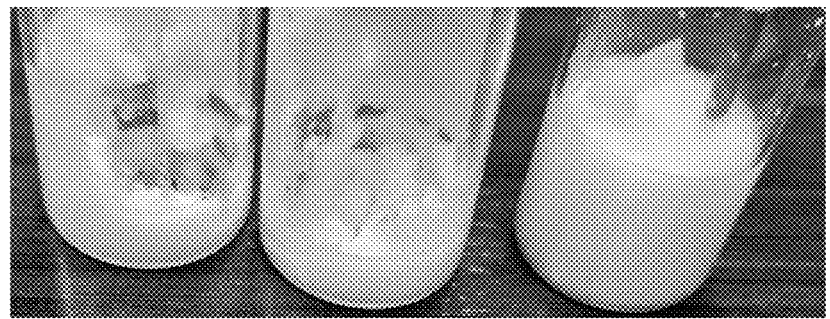
FIG. 8 is an image of exemplary fat formulations at about room temperature.
FIG. 9 is a tabular representation of exemplary fat formulations for a beef tallow mimic or analogue with relative compositions of each fatty acid (e.g., approximate % by mass of each free fatty acid in a mixture that is interesterified, initial % such as by mass of each free fatty acid in a solution that is to be esterified, approximate percentage by mass of each free fatty acid in a final lipid composition, etc.).

The composition of the formulation (e.g., the fatty acid composition such as the chain lengths, relative amounts of each fatty acid chain length, etc.; the additive composition such as types of additives, number of additives, additive concentration, etc.) can be selected based on a target fat profile and/or fat property. Examples of fat properties to achieve can include: thermodynamic behavior (e.g., melting point, melting profile, smoke point, enthalpy of melting, crystallization point, crystallization profile, crystallization phase, etc.), rheological behavior (e.g., slip point, viscosity, plasticity, consistency, flow, etc.), organoleptic behavior (e.g., taste, smell, feel, sound, appearance, color, mouth feel, etc.), nutritional content (e.g., calorie content, fatty acid composition, etc.), pharmacological behavior (e.g., laxative effect, constipating effect, etc.), and/or any suitable property(s). The formulation is typically solid (e.g., at room temperature; as shown for example in FIG. 8; etc.), but can be liquid, gel, and/or any suitable phase.

Figure 3:
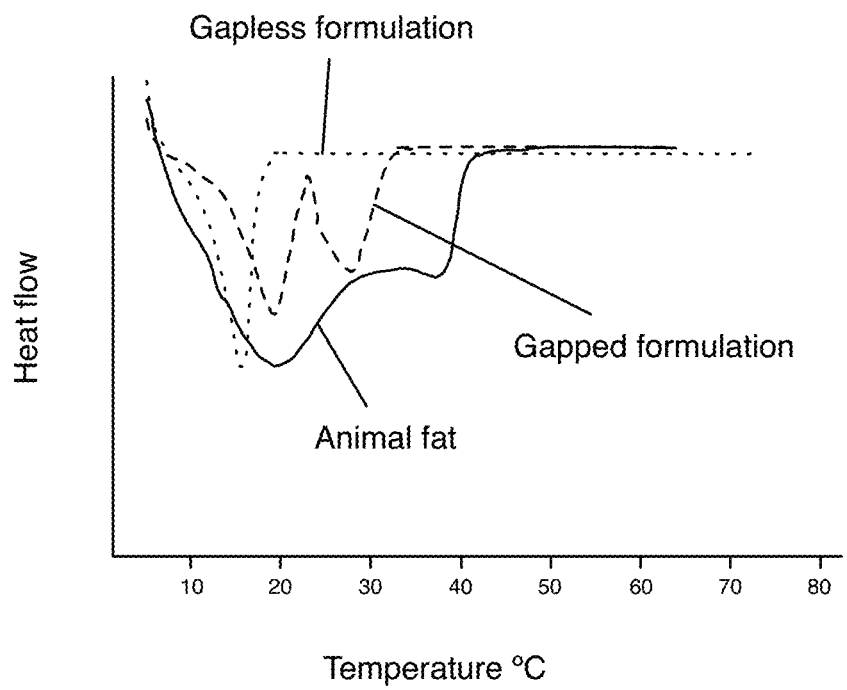
FIG. 3 is a schematic representation of an example of thermal behavior of a representative fat, a representative gapped formulation, and a representative non gapped formulation.

For instance, as shown for example in FIG. 3, a formulation can be selected to imitate a melting profile of a fat to be replicated (e.g., where the melting profile of the formulation and/or the fat to be replicated can be measured using differential scanning calorimetry, capillary melting point analysis, etc.). As a second example, a formulation can be formed to imitate a solid fat content of a target fat to replicate (e.g., at a specific temperature, over a specific temperature range, etc.). In this example, the solid fat content as a function of temperature can be determined using nuclear magnetic resonance (NMR, such as pulsed NMR (pNMR)), differential scanning calorimetry (DSC such as corrected DSC), dilatometry, optical refractometry (such as temperature modulated optical refractometry), ultrasonic velocimetry, near-infrared spectroscopy, and/or using any suitable technique(s). As a third example, a formulation can be formed to imitate a viscosity (e.g., dynamic viscosity, kinematic viscosity, etc.) of a target fat to replicate (e.g., at a specific temperature, over a specific temperature range, etc.). The viscosity can be measured, for instance, using a rheometer (e.g., acoustic rheometer, rotational rheometer, shear rheometer, extensional rheometer, falling plate rheometer, capillary or contraction flow rheometer, etc.), a viscometer (e.g., a glass capillary viscometer, Stormer viscometer, vibrating viscometer, etc.), viscosity cup (e.g., Zahn cup, Ford viscosity cup, etc.), fluorescence correlation spectroscopy, and/or using any suitable technique(s). As a fourth specific example, a formulation can be formed to imitate a specific heat of a target fat to replicate (e.g., at a specific temperature, over a specific temperature range, etc.). The specific heat can be measured using a calorimeter (e.g., DSC) and/or using any suitable equipment. As a fifth specific example, a formulation can be formed to imitate an organoleptic characteristic (e.g., mouth feel, texture, etc.) of a target fat to replicate (e.g., at a specific temperature, over a specific temperature range, etc.) The organoleptic characteristic can be assessed, for example, based on a test subject's perception of the formulation (e.g., subject rating of similarity or difference between the formulation and the fat to be replicated), based on shear pressure (e.g., measured using a rheometer, diverging fringe shear stress sensor, micropillar shear stress sensor, electro diffusional method, etc.), and/or in any suitable manner. In a sixth specific example, a formulation can be formed to imitate a target fat to replicate (e.g., at a specific temperature, over a specific temperature range, etc.) any combination of properties from the preceding examples. However, any suitable properties can be matched or used to compare properties, the formulation can be chosen to have properties that are not matched to properties of an existing fat (e.g., formulation need not emulate, imitate, replicate, mimic, etc. an existing or known fat), and/or can otherwise be chosen.

The formulation can be optimized for (e.g., to match a differential scanning calorimetry profile for, a solid fat content over, a rheological behavior across, an organoleptic property at or over, dilatometry scan, alpha peak temperature, etc.) a particular temperature (e.g., room temperature such as a temperature between about 10-30° C., refrigeration temperature such as a temperature between about 0-5° C., freezer temperature such as a temperature less than about 0° C., a melting temperature such as for a fat to replicate, crystallization temperature such as for a fat to replicate, solvent boiling temperature such as about 100° C. for water at about 1 atm of pressure, etc.), over a temperature range (e.g., a 1° C., 5° C., 10° C., 20° C., 50° C., 100° C., etc. range of temperatures), over a temperature cycling curve (e.g., for a number of cycles such as 1 cycle, 2 cycles, 5 cycles, 10 cycles, 20 cycles, 50 cycles, 100 cycles, values or ranges therebetween, etc.), over a temperature gradient (e.g., a rate of temperature change such as 1° C./min, 5° C./min, 10° C./min, 20° C./min, etc.), and/or can be optimized based on any suitable information.

The formulation preferably predominantly includes lipids. For example, at least about 95% (e.g., 94.5%, 94.9%, 95.5%, 96%, 97%, 98%, 99%, 99.5%, 99.9%, 99.95%, 99.99%, 99.995%, 99.999%, 100%, etc. such as by mass, by volume, by stoichiometry, etc.) of the formulation can be lipids (including or excluding glycerol for the formation of triglycerides and other glycerolipids). However, in some variants, the formulation can include up to about 5% (e.g., by mass, by volume, by stoichiometry, etc.) of each additive (e.g., a formulation with two additives could have a composition that is about 5% a first additive, about 5% a second additive, and about 90% lipid), a formulation can include more than about 5% of one or more additive (e.g., 6%, 7%, 8%, 10%, 15%, etc.), and/or the formulation can have any suitable composition.

The formulation can optionally include a solvent. The lipid(s) and/or the additive(s) can be dissolved in the solvent, suspended in the solvent (e.g., form a colloidal solution, form an emulsion, form a miniemulsion, etc. where the solvent can form droplets, act as the continuous phase, act as the dispersion medium, etc.), phase separate from the solvent, can include residual solvent (e.g., from an extraction process), and/or can otherwise be mixed and/or separated. Exemplary solvents include water or glycerol; however, any suitable solvent (e.g., ethanol, heptane, hexane, ethyl acetate, methylene chloride, limonene, acetone, benzyl alcohol, butane-1,3-diol, carbon dioxide, glyceryl diacetate, glyceryl triacetate, glyceryl tributyrate, isopropyl alcohol, methanol, methyl ethyl ketone, 2-nitropropane, 1,2-propylene glycol, triethyl citrate, etc.) can be used.

The lipids are preferably derived from a chemical process (e.g., oxidation of paraffins, from captured carbon dioxide, from natural gas, from carbon monoxide, from syngas, from coal, from biomass, from a Fischer-Tropsch synthesis, from a Ziegler-method synthesis, from a modified Ziegler synthesis, artificial fatty acids, etc.), but can additionally or alternatively be cultured (e.g., produced via cells), derived from biological processes (e.g., fatty acids obtained from plants, fungi, microbes, animals, etc.), and/or can otherwise be obtained or derived.

The lipids preferably include fatty acids with a chain length between 4 and 23 carbons long. However, shorter fatty acids (or short chain carboxylic acids), longer fatty acids (e.g., 24, 25, 26, 27, 28, 29, 30, 40, values therebetween, etc. carbon atoms long), and/or other lipids can be included in the formulation.

The fatty acids are preferably saturated fatty acids. The saturated fatty acids are preferably not derived from hydrogenation of unsaturated fatty acids (e.g., do not include cis-unsaturated fats that have been hydrogenated). However, the saturated fatty acids can be derived from hydrogenated fatty acids (e.g., when hydrogenation results in complete hydrogenation such as less than about 0.1% unsaturated fatty acids remain). For example, trans-unsaturated fatty acids (e.g., impurities in the saturated acid formation process, impurities from a cis-unsaturated fat hydrogenation process, etc.) can be hydrogenated (e.g., fully hydrogenated to saturated fatty acids) and included in the formulation. However, the fatty acids can include unsaturated fatty acids (e.g., aromatic fatty acids, cyclic fatty acids, including double or triple bonds, etc.). The fatty acids are preferably linear (e.g., straight-chain, unbranched, etc.). However, the fatty acids can additionally or alternatively be nonlinear (e.g., branched, cyclic, etc.). In a specific example, the formulation can consist essentially of linear fatty acids (e.g., >90% linear, >95% linear, >98% linear, >99% linear, >99.9% linear, >99.99% linear, etc.; linear fatty acids; include less than a trace amount of branched fatty acids; include an amount of branched fatty acids that does not materially affect the characteristics of the fatty acids; includes ≤1%, ≤0.5%, ≤0.1%, ≤0.05%, ≤0.01%, etc. branched fatty acids by mass, by volume, by stoichiometry, etc.; etc.). As a second specific example, the formulation can consist of (e.g., include only, be composed of, etc.) linear fatty acids. In a third specific example, the formulation can consist essentially of saturated fatty acids (e.g., include less than a trace amount of unsaturated fatty acids; include an amount of unsaturated fatty acids that does not materially affect the characteristics of the saturated fatty acids; includes ≤3%, ≤1%, ≤0.5%, ≤0.1%, ≤0.05%, ≤0.01%, etc. unsaturated fatty acids by mass, by volume, by stoichiometry, etc.; etc.). In a variation of the third specific example, the formulation can consist of (e.g., include only, be composed of, etc.) saturated fatty acids. However, the formulation (and/or lipids thereof) can include any suitable fatty acids (e.g., a formulation that includes unsaturated fatty acids).

Figure 2:
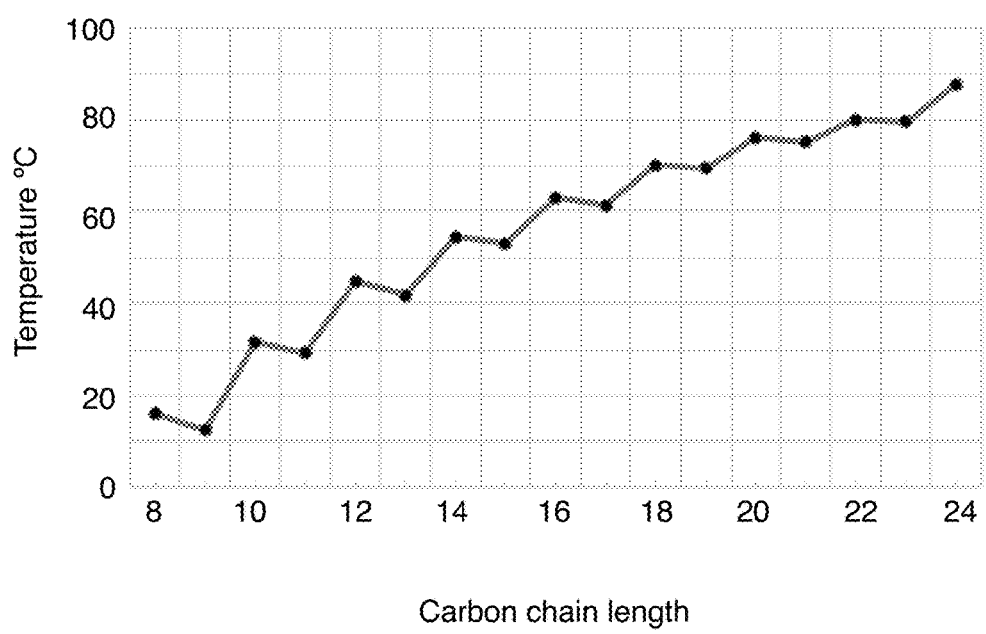
FIG. 2 is a chart of approximate fatty acid melting points as a function of chain length.

The formulation preferably includes a gap in the fatty acids of the formulation. A gap preferably refers to one or more missing even and/or even and odd pair (where even and odd pair generally, but not exclusively, refers to an even fatty acid and a fatty acid with one more carbon atom that the even fatty acid; refers to fatty acids with similar melting points as shown for example in FIG. 2; etc.) of fatty acids from the formulation. A fatty acid is typically identified (e.g., defined, referred, etc.) as missing (e.g., absent, excluded, etc.) when said fatty acid is less than about 5% (e.g., by mass, by volume, by stoichiometry, etc.) of the fatty acid composition. However, a fatty acid can be missing when said fatty acid is less than 0.01%, 0.05%, 0.1%, 0.5%, 1%, 2%, 5%, values or ranges therebetween, and/or can otherwise be defined (e.g., where the percentage can refer to a mass percentage, volume percentage, stoichiometry percentage, etc.). As an illustrative example, a formulation that includes (e.g., only includes) fatty acids with C8-C11 and C14-C16 fatty acids would be a gapped formulation as C12 (and C13) are not in the formulation (e.g., are each less than about 5% of the formulation). The gap can be beneficial for enabling or leading to complex behavior (e.g., broad melting profile, multiple peaks in a melting profile, as shown for example in FIG. 3, etc.) in the behavior of the formulation. However, a gapped formulation can otherwise be beneficial and/or can otherwise be defined.

However, a formulation without a gap can be used.

Figure 4A:
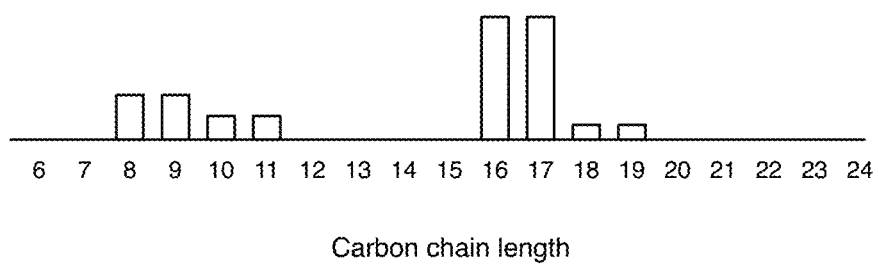
FIGS. 4A-4C are schematic representations of exemplary relative fatty acid chain lengths for a gapped formulation, a gapped formulation, and a gapped even-only formulation respectively.
Figure 4B:
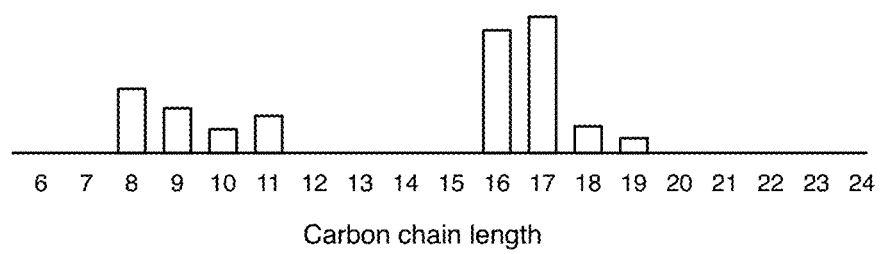
Figure 4C:
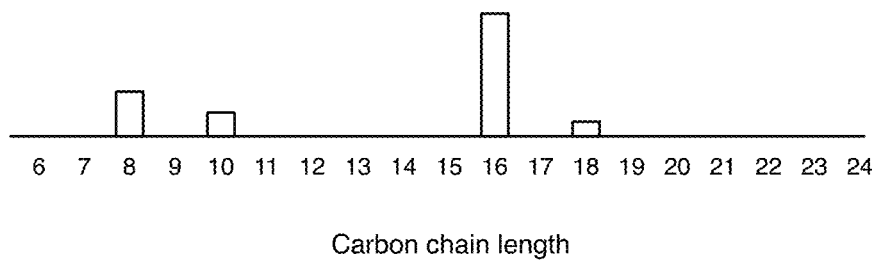

A formulation can include a single gap (e.g., be missing a single even carbon or even and odd pair carbon chain; as shown for example in FIG. 4A, FIG. 4B, or FIG. 4C; etc.) and/or can include a plurality of gaps (e.g., 2 gaps, 3 gaps, 4 gaps, etc.). As an illustrative example, a multigap formulation could include C8, C9, C12, C13, C16, C17, C20, C21, C22, and/or C23 (where C # refers to a fatty acid with the # of carbon atoms). However, any suitable multigap formulation can be used.

Figure 5A:
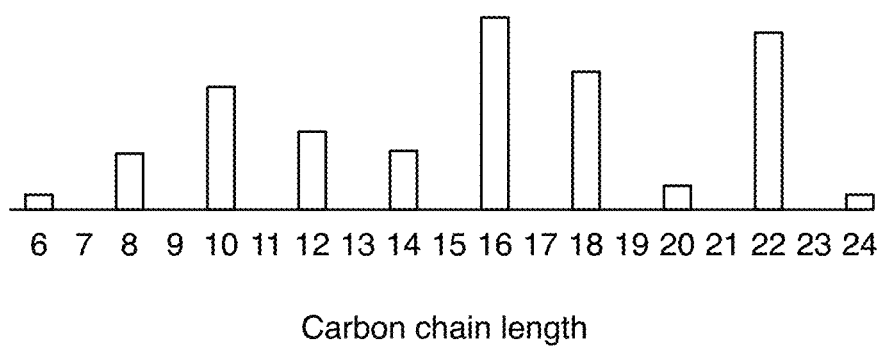
FIGS. 5A and 5B are schematic representations of exemplary relative fatty acid chain lengths for an even-only ungapped and an even and odd gapped formulation, respectively.
Figure 5B:
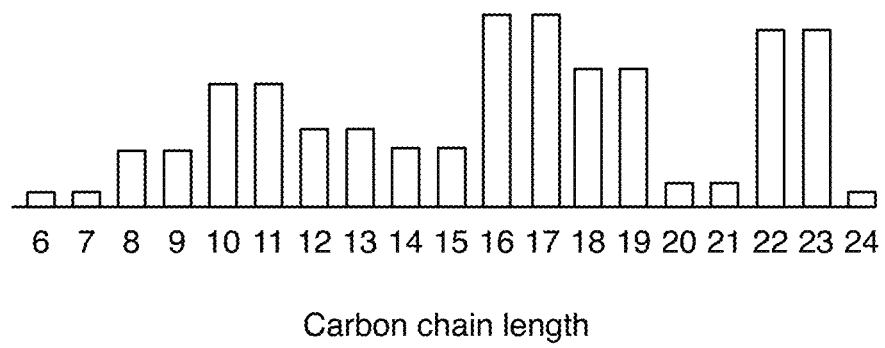

In some variants (as shown for example in FIG. 5A), the formulation can include only even chain length fatty acids. These variants can be beneficial as even chain length fatty acids are generally recognized as safe to consume and/or can otherwise be beneficial. In other variants (as shown for example in FIG. 5B), the formulation can include even and odd chain length fatty acids. These variants can be beneficial for producing less waste, requiring less processing (e.g., fewer separations, less fractionation, etc.), resulting in lower carbon footprint, and/or can otherwise be beneficial. In other variants, the formulation could include only odd chain length fatty acids, which may be beneficial for using materials remaining from other formulations (e.g., using separated fatty acids from an even-only chain formulation) or for providing metabolically advantageous properties (e.g., anti-inflammatory, anticarcinogenic, antioxidant, antibiotic, non-cytotoxic immunosuppressive, glucogenic, etc.; have an inverse relationship with disease development for: atherosclerosis, prediabetes and type II diabetes, coronary heart disease, insulin sensitivity, etc.; etc.) to food products. However, the formulation can include any suitable fatty acid(s).

The lipids can include free fatty acids, fatty acid esters (e.g., mono glycerides such as 1-glycerides, 2-glycerides; diglycerides such as 1,2-glycerides, 1,3 glycerides; triglycerides; etc.), and/or any suitable lipids. In a first specific variant, the lipids of the formulation can include less than about 0.5% free fatty acid (e.g., ≤0.3% free fatty acid, ≤0.1% free fatty acid, ≤0.05% free fatty acid, ≤0.02% free fatty acid, ≤0.01% free fatty acid, ≤0.005% free fatty acid, ≤0.001% free fatty acid, etc.). In a specific example of the first specific variant, the lipids of the formulation can be composed of (e.g., consist of, include only, etc.) fatty acid esters. In a second specific example of the first specific variant, the lipids of the formulation can be composed essentially of (e.g., consist essentially of) fatty acid esters. In a second specific variant, the lipids of the formulation can be composed essentially of (e.g., consist essentially of) diglycerides and/or triglycerides (e.g., with less than about 0.1%, 0.5%, 1%, 5%, etc. by mass free fatty acids, monoglycerides, etc.). In a variation of the second specific variant, the lipids of the formulation can be composed of (e.g., consist of, include only, etc.) diglycerides and/or triglycerides.

Figure 6A:
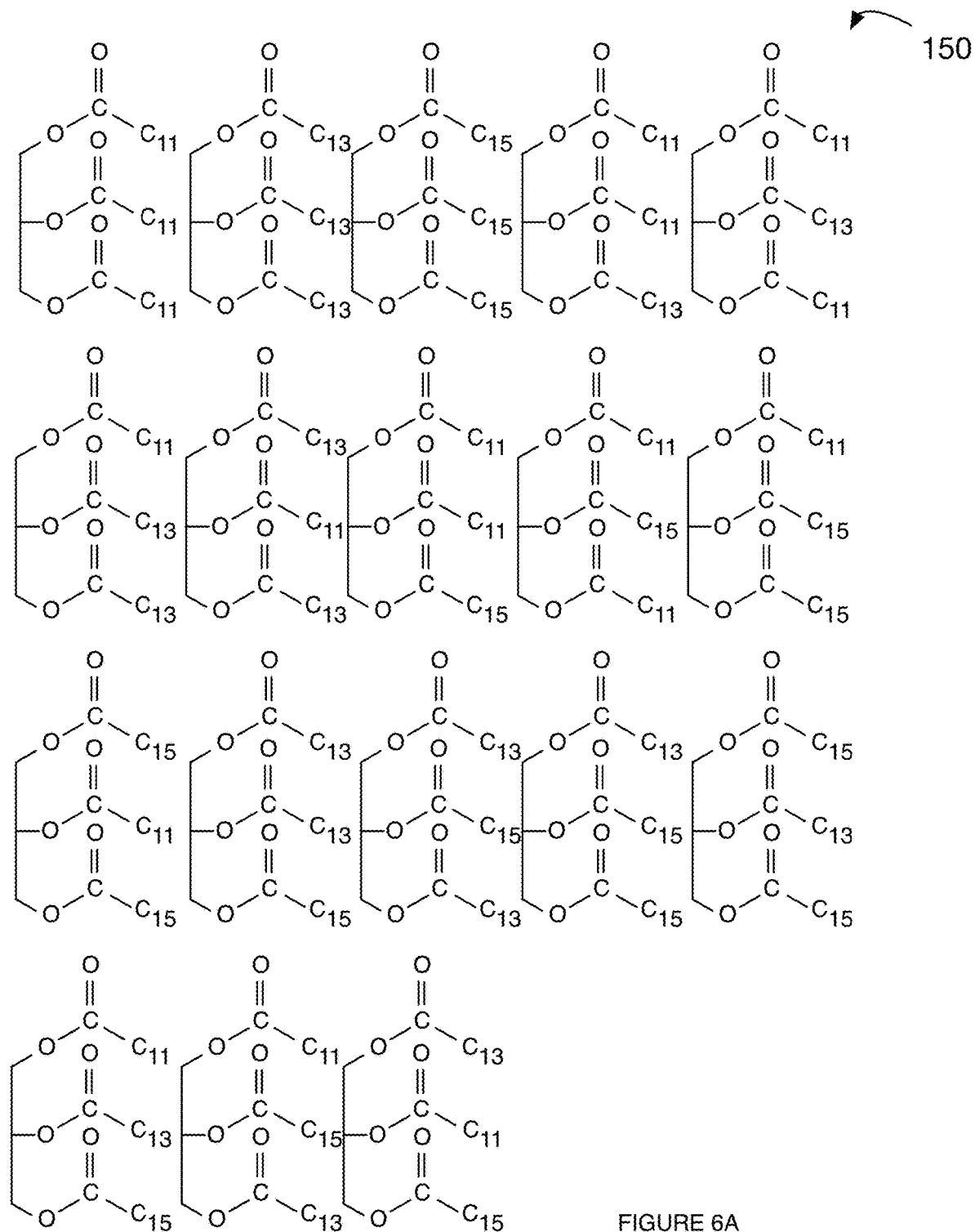
FIG. 6A are exemplary triglycerides that can be formed by interesertification of lauric acid, myristic acid, and palmitic acid with glycerol. In this example, enantiomers of some triglycerides can be present (but are not explicitly listed).
Figure 6B:
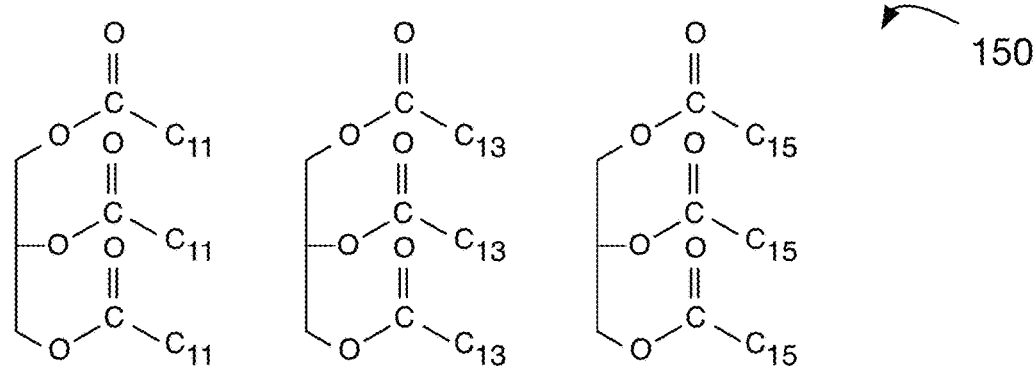
FIG. 6B are exemplary triglycerides that can be used in a formulation of trilaurin, trimyristin, and tripalmitin that are physically mixed (e.g., after the esters have been formed).

When the lipids include esters (particularly but not exclusively triglycerides, esters of glycerol, etc.), the fatty acids of the esters can be interesterified (e.g., form heteroesters, as shown for example in FIG. 6A, chemically mixed, etc.) and/or can be intraesterified (e.g., form homoesters, as shown for example in FIG. 6B, physically mixed, etc.). For instance, to form an interesterified formulation, free fatty acids can be mixed and esterified simultaneously. In some variants, a first set of free fatty acids can be mixed and partially esterified (such as to form mono or diglycerides), where the partially esterified fatty acids can then be esterified with a second set of fatty acids to form the triglycerides. In these variants, the second set of fatty acids can include longer-chain fatty acids than the first set of fatty acids and preferably occupy the 3-position of glycerol (e.g., on average the longest chain fatty acid is in the 3-position of the glycerol), but can additionally or alternatively occupy any suitable position (e.g., 1-position, 2-position) of the glycerol and/or include shorter and/or comparable chain lengths to the first set of fatty acids. In related variants, the fatty acids can be esterified in stages (e.g., to account for different esterification reaction rates, to ensure a random or stochastic distribution of triglycerides and/or diglycerides based on the fatty acids to be interesterified, to generate a non-random or non-stochastic distribution of triglycerides and/or diglycerides based on the fatty acids to be interesterified, etc.). Similarly, to form an intraesterified formulation, free fatty acids can be separately esterified (e.g., to form monoglycerides, to form diglycerides, to form triglycerides, etc.), and the esters can be mixed. However, the esters can otherwise be formed.

In a first specific example, the formulation can include a plurality of (e.g., includes more of than any other constituent(s), but not necessarily a majority of) triglycerides (e.g., triacylglycerides) that consist of (e.g., include only, are composed of, etc.) glycerol esterified with saturated fatty acids. In the first specific example, the remainder of the sample can include additives, diglycerides (e.g., diacylglycerides, 1,2-diglycerides, 1,3-diglycerides; where the diglycerides can consist of, be composed of, include only, etc. glycerol esterified with saturated fatty acids), monoglycerides (e.g., consisting of, composed of, including only, etc. saturated fatty acids), solvent (e.g., water, glycerol, etc.), and/or any suitable components or constituents. In some variations of the first specific example, a portion (e.g., a minority portion such as less than about 10%, 5%, 4%, 2%, 1%, 0.5%, 0.1%, 0.05%, 0.01%, 0.005%, 0.001%, etc. by mass, by count, by volume, etc.) of the glycerides (e.g., triglycerides, diglycerides, monoglycerides, etc.) can include saturated fatty acids (e.g., a single saturated fatty acid, more than one saturated fatty acid, etc.). The fatty acids of the first specific example are preferably linear (e.g., unbranched, acyclic, nonaromatic, etc.). However, some variations can include branched, cyclic, aromatic, and/or other nonlinear fatty acids.

In a second specific example, the formulation can include a majority of (e.g., include at least 50% such as 55%, 60%, 65%, 70%, 75%, 80%, 85%, 90%, 95%, etc.) triglycerides (e.g., triacylglycerides) that consist of (e.g., include only, are composed of, etc.) glycerol esterified with saturated fatty acids. In the second specific example, the remainder of the sample can include additives, diglycerides (e.g., diacylglycerides, 1,2-diglycerides, 1,3-diglycerides; where the diglycerides can consist of, be composed of, include only, etc. glycerol esterified with saturated fatty acids), monoglycerides (e.g., consisting of, composed of, including only, etc. saturated fatty acids), solvent (e.g., water, glycerol, etc.), and/or any suitable components or constituents. In some variations of the second specific example, a portion (e.g., a minority portion such as less than about 10%, 5%, 4%, 2%, 1%, 0.5%, 0.1%, 0.05%, 0.01%, 0.005%, 0.001%, etc. by mass, by count, by volume, etc.) of the glycerides (e.g., triglycerides, diglycerides, monoglycerides, etc.) can include saturated fatty acids (e.g., a single saturated fatty acid, more than one saturated fatty acid, etc.). The fatty acids of the second specific example are preferably linear (e.g., unbranched, acyclic, nonaromatic, etc.). However, some variations can include branched, cyclic, aromatic, and/or other nonlinear fatty acids.

In an illustrative example of the second specific example, at least 50% (such as 55%, 60%, 65%, 70%, 75%, 80%, 85%, 90%, 95%, etc. by mass, by count, by stoichiometry, by volume, etc.) of the triglycerides can consist of glycerol esterified with a first saturated fatty acid, a second saturated fatty acid, and a third saturated fatty acid. The first saturated fatty acid, the second saturated fatty acid, and the third saturated fatty acid can be the same or different. The distribution of triglycerides (e.g., relative ratio of triglycerides with varying amounts of the first saturated fatty acid, second saturated fatty acid, and third fatty acid) within the formulation can form a multinomial distribution, a Ewens distribution, and/or can form any suitable distribution. As a simplified scenario, the triglycerides for a formulation that includes 60% C8 and 40% C10 fatty acids could include about 21.6% tri-C8 glyceride; about 43.2% di-C8, mono-C10 glyceride; about 28.8% mono-C8, di-C10 glyceride; and about 6.4% tri-C10 glyceride (where each percentage can be an approximate percent mass, an approximate percent volume, an approximate percent stoichiometry, etc.). In this simplified scenario (as well as more complex scenarios), the approximate (or other terms for uncertainty) percentages can account for differences that arise as a result of mixing, as a result of differences in mass for different fatty acids, account for changes in mass resulting from the reaction, and/or can account for other suitable effects (e.g., as recognized by a person of ordinary skill in the art). The distributions can be more complex for more complex scenarios (e.g., when the first, second, and third saturated fatty acids are selected from more than two fatty acids, when the selected fatty acids can have more complex probabilities, during staged esterification, etc.) but generally follow and extend a similar trend in distribution of triglycerides. Note also that frequently diglycerides will follow a similar distribution to that of the triglycerides (e.g., for the above simplified scenario any diglycerides of the solution will have a distribution of about 36% di-C8 glyceride, about 48% mono-C8, mono-C10 diglyceride, and about 16% di-C10 glyceride).

In a third specific example, the formulation (or lipids thereof) can consist essentially of (e.g., be composed essentially of, include additives or other constituents that do not or have a concentration that does not significantly modify a target property of the formulation, hydroxyl number less than about 15, etc.) triglycerides (e.g., triacylglycerides), where the triglycerides can consist of (e.g., include only, are composed of, etc.) glycerol esterified with saturated fatty acids. In variations of the third specific example, an additive or other constituent that does not significantly modify a target property can change a thermal property by less than about 1° C. (e.g., a peak, freezing point, melting point, phase transition, α-peak, temperature at which a solid fat content is a target value, etc. can be changed from a temperature for the property to occur at by less than about 1° C.), a change in a viscosity (e.g., over a range of temperatures, at a particular measurement temperature, etc. such as a temperature at which a solid fat content of the formulation is 0.05%, 0.1%, 0.5%, 1% etc.; a temperature between about 5-180° C.; etc.) that is less about 1 mPa s, a change in specific heat (e.g., over a range of temperatures, at a particular measurement temperature, etc. such as a temperature at which a solid fat content of the formulation is 0.05%, 0.1%, 0.5%, 1% etc.; a temperature between about 5-180° C.; etc.) that is less about 0.1 kJ kg$^{-1}$K$^{-1}$, a change in shear stress (e.g., over a range of temperatures, at a particular measurement temperature, etc. such as a temperature at which a solid fat content of the formulation is 0.05%, 0.1%, 0.5%, 1% etc.; a temperature between about 5-180° C.; over a range of shear rates, at a particular shear rate such as a shear rate between about 0 and 100 s$^{-1}$; etc.) that is less than about 10 Pa, an organoleptic property changes by less than an amount perceivable by a person (e.g., trained analyst, trained tester, untrained tester, etc.), and/or can affect other suitable properties in any suitable manner. In a specific variation of the third specific example, the lipids of the formulation (and/or the formulation as a whole) can consist of (e.g., be composed of, include only, etc.) triglycerides (e.g., triacylglycerides). In variations, the third specific example can be a lipid component of the formulation, where the formulation can include solvent, additives (e.g., as discussed below), and/or any suitable materials or constituents. The fatty acids of the third specific example are preferably linear (e.g., unbranched, acyclic, nonaromatic, etc.). However, some variations can include branched, cyclic, aromatic, and/or other nonlinear fatty acids.

In some variants, different subsets of the fatty acids can be interesterified, where each subset of interesterified fatty acids is then physically mixed to form the formulation. These variants can form (e.g., be referred to as) coformulations of two or more lipid formulations. A potential technical advantage of these variants is increased control over properties of the resulting fat (and/or in a given food application). Typically, these coformulations result in a material where the properties are approximately an arithmetic mean (e.g., based on the percentage of each individual formulation that is included) of the formulations. However, the coformulation could have a nonlinear property (e.g., a value that is a nonlinear combination of properties of the individual formulations), unexpected properties (e.g., a coformulation that is softer than any of the individual formulations, a coformulation that is harder than any of the individual formulations, etc.), and/or any suitable properties (e.g., that depend on a foodstuff the coformulation is used in, that depends on additives, etc.). As a specific example, fatty acids with chain lengths less than a gap length can be interesterified together and fatty acids with chain lengths greater than a gap length can be interesterified together. In another specific example, a first fatty acid with a chain length less than the gap chain length can be interesterified with a second fatty acid with a chain length greater than the gap chain length.

A hydroxyl number (e.g., a measure of the free hydroxyl group content of, number of milligrams of alkali metal hydroxide equivalent to the hydroxyl content of 1 gram of the formulation) of the formulation is preferably less than about 50 (e.g., ≤0.1, ≤0.5, ≤1, ≤2, ≤5, ≤7, ≤10, ≤12, ≤15, ≤20, ≤25, ≤30, ≤35, ≤40, ≤45, etc.). In some variants, a hydroxyl number of about 100 (e.g., 80-120) or between about 50 and about 100 can be used (e.g., to provide a technical advantage of enhanced emulsification). However, the hydroxyl number of the formulation can be any suitable value. The hydroxyl number of the formulation can be measured (e.g., determined, estimated, etc.) using acetylation (e.g., using acetyl chloride, acetic anhydride-pyridine, etc.) such as according to USP 401, by determining an acetyl value, and/or can be determined in any manner.

The additives can function to modify one or more properties of the formulations. The additives can be dissolved in the lipid, dissolved in the solvent, form an emulsion with the lipid, form a separate phase from the lipid, and/or can otherwise be included in the formulation. Additives are typically included at a concentration that is less than about 10% (e.g., by mass, by volume, by stoichiometry, etc. such as 0.001%, 0.005%, 0.01%, 0.05%, 0.1%, 0.5%, 1%, 5%, values or ranges therebetween, <0.001%, etc.). Exemplary properties that additives can be used to modify can include: taste, surface tension, lipid solubility, nutritional value, rheological behavior, properties of the formulation to mimic a target fat, oxidation, organoleptic properties, and/or any suitable properties.

Exemplary additives include flavorants, antioxidants, glycerides (e.g., monoglycerides, diglycerides, etc. such as of fatty acids of the formulation), byproducts (e.g., from a fatty acid synthesis, from esterification, etc.), nutritional additives, colorants, and/or any suitable additives.

Flavorants can function to modify a taste and/or smell of the formulation. Flavorants can include: esters, aldehydes, ketones, lactones (e.g., γ-lactones, δ-lactones, macrocyclic lactones, polycyclic lactones, etc.), acids, alcohols, salts (e.g., as described below), and/or any suitable flavorants. For example, short chain (e.g., with between about 1 and 5 carbon atoms) fatty acids, fatty aldehydes, fatty ketones, fatty acid methyl esters, fatty alcohols, and/or any suitable materials can be used as flavorants. In another example, liquid smoke (e.g., condensed products from smoke such as tar, acids, carbonyl-containing compounds, phenol derivatives, etc.) can be included in a formulation. However, any suitable flavorant(s) can be used or included.

Antioxidants can function to protect the formulation from degradation (e.g., oxidative degradation, auto-oxidation, light-based degradation, etc.) and/or increase a shelf life of the formulation. Some variants of formulations can omit the antioxidants, particularly but not exclusively formulations that use saturated fatty acids, as the formulation and/or constituents thereof can be sufficiently stable without an antioxidant. However, some formulations that predominantly or exclusively include saturated fatty acids can still undergo rancidification (e.g., hydrolysis, perhydrolysis, hydrolytic degradation, alcoholysis, acidolysis, transformation into peroxyacids, epoxidation, etc.). In a specific example, the rancidification can be particularly problematic when residual free fatty acids remain in the formulation (e.g., resulting from degradation or reaction of the free fatty acids). However, rancidification can occur for any lipid formulation (e.g., for some formulations such as depending on light and/or temperature during storage, transport, manufacturing, etc.; addition of or inclusion of free fatty acids can be beneficial to mitigate rancidification as the free fatty acids can restrict the amount of mono- and/or di-glycerides that exist in the formulation). Exemplary antioxidants include: ascorbic acid, BHA, BHT, propyl gallatehydroxytyrosol tyrosol, caffeic acid, citric acid, ferulic acid, alkannin, shikonin, carnosic acid alpha-tocopherol, EDTA, gallic acid, catechin, quercetin, myricetin, catechin, genistein, sesamol, oleuropein, hydroxytyrosol, carnosic oryzanols, tocols, ferulic acid, beta-carotene, lycopene, and/or any suitable antioxidants could be used.

Byproducts (e.g., from the fatty acid synthesis, from the esterification, etc.) can remain in the formulation after purification (e.g., at a concentration that does not substantially impact one or more target properties of the formulation), formulation mixing, can be introduced during the formulation production (e.g., be intentionally added), and/or can otherwise occur within the formulation. The byproducts can be beneficial as tracers (e.g., identifying a source, manufacturing method, etc. of the fatty acids). However, different tracers can be included (e.g., as an additive). The byproducts are preferably nontoxic but can have any suitable toxicity.

In a first variation of a tracer (e.g., a byproduct that can be used as a tracer), the formulation can include branched fatty acids (e.g., where a number of branches, a branching position, a branch length, concentration of branched fatty acids, etc. can be indicative of a fatty acid source. In a second variation of a tracer, the isotopic distribution (e.g., ratio of $^{12}C$ to $^{13}C$, $^{12}C$ to $^{14}C$, $^{13}C$ to $^{14}C$, $^{12}C$ to $^{13}C$ to $^{14}C$, $^{1}H$ to $^{2}H$, $^{13}C$ to $^{2}H$, $^{14}C$ to $^{2}H$, $^{12}C$ to $^{2}H$, $^{16}O$ to $^{17}O$, $^{16}O$ to $^{18}O$, $^{17}O$ to $^{18}O$, $^{17}O$ to $^{12}C$, $^{18}O$ to $^{12}C$, $^{2}H$ to $^{16}O$, $^{13}C$ to $^{16}O$, $^{14}C$ to $^{16}O$, other ratios of isotopes; position of isotopes in the fatty acid such as relative position distribution of deuterium atoms on the fatty acid, relative position of $^{13}C$ or $^{14}C$ in a carbon chain, etc.; etc.) within the formulation (or within lipids thereof) can be used to determine a source, manufacturing method, and/or otherwise be used to trace the formulation. In a third variation of a tracer, a formulation can be deficient in and/or contain an excess of fatty acids of a given chain length (e.g., odd length fatty acids, fatty acids with a particular chain length such as C9 or C10, etc.). In these variations (and/or for the formulation in general), the concentration of fatty acids (and/or tracers, byproducts, additives, etc.) can be determined (e.g., estimated, measured, tested, etc.) using gas chromatography (e.g., gas chromatography in combination with a flame ionization detector, gas chromatography in combination with time-of-flight, gas chromatography mass spectrometry, etc.), dielectric spectroscopy, high performance liquid chromatography (HPLC), nuclear magnetic resonance spectroscopy (NMR), Fourier-transform infrared spectroscopy (FTIR), Raman spectroscopy, near-infrared spectroscopy (e.g., near-infrared reflectance, near-infrared transmittance, etc.), impedance spectroscopy, mass spectrometry, and/or using any suitable technique(s) (e.g., using a machine learning algorithm trained using known fat compositions and one or more techniques above to estimate the fat composition of a formulation). However, any suitable byproducts can be present in the formulation.

Nutritional additives can function to modify a nutritional content of the formulation. For example, nutritional additives can add essential (or nonessential) nutrients (e.g., vitamins, minerals, etc.), modify a calorie density of the formulation, and/or can otherwise modify a nutritional content of the formulation. In one variation, fat-soluble vitamins (e.g., vitamins A, D, E, or K) can be added to the formulation (e.g., to provide between 1-500% of the daily recommended value of the vitamin per serving of the formulation). In another variation, fats (e.g., essential fatty acids such as alpha-linoleic acid and/or linoleic acid for humans, arachidonic acid, docosahexaenoic acid, etc.; conditionally essential fatty acids such as eicosapentaenoic acid, gamma-linolenic acid, dihomo-γ-linolenic acid, etc.; long chain polyunsaturated fatty acids; short chain polyunsaturated fatty acids; unsaturated fatty acids such as Ω-3, Ω-6, Ω-9, oleic acid, etc.; conjugated fatty acids such as calendic acid, rumenic acid, etc.; etc.) can be added to the formulation. For instance, between about 250 mg and 5000 mg of unsaturated fats (per serving of formulation, per 1-100 grams of formulation, per 1-100 grams of fatty acids in the formulation, etc.) can be added to the formulation. When provided as glycerides, the unsaturated fats can be interesterified with the saturated fatty acids, can be interesterified with themselves (e.g., interesterify different unsaturated fatty acids), can be homoesters (e.g., that are physically mixed with other glycerides or fatty acids), and/or can otherwise be esterified with any suitable species and/or otherwise be included in the formulation (e.g., as free fatty acids, as fatty acid esters, etc.). For instance, the saturated fatty acid oleic acid can be provided in the formulation as triolein (e.g., which can be beneficial as adding trace amounts of saturated fatty acids as separate triacylglycerides rather than interesterifying will typically result in minimal changes to the properties of the formulation). Other saturated fatty acids (including combinations) can be added in a similar manner (e.g., linoleic acid can be added as linolein; linoleic acid and oleic acid can be added as linolein, triolein, glyceryl 1,2-dioleate 3-linoleate, glyceryl 1,3-dioleate 2-linoleate, glyceryl 1,2-dilinoleate 3-oleate, glyceryl 1,3-dilinoleate 2-oleate, and/or diacylglycerides including either or both of oleate linoleate; similar for other fatty acids). In a third variation, one or more carbohydrates or other sweetener (e.g., monosaccharides such as glucose, galactose, fructose, etc.; disaccharides such as sucrose, lactose, maltose, etc.; oligosaccharides; polysaccharides; sugar alcohols such as xylitol, sorbitol, mannitol, erythritol, etc.; artificial sugar such as allulose, aspartame, cyclamate, mogrosides, sucralose, etc.; etc.) can be added. In a fourth variation, one or more salts can be added to the formulation. In the fourth variation, the salt can additionally (or alternatively) provide flavor, modify a (physical) property of the formulation, act as an emulsifier, and/or can otherwise function. Exemplary salts can include alkyl halides (e.g., sodium chloride, sodium bromide, sodium iodide, potassium chloride, potassium bromide, potassium iodide, etc.), alkaline earth metal halides (e.g., magnesium chloride, magnesium bromide, magnesium iodide, calcium chloride, calcium bromide, calcium iodide, etc.), phosphates (e.g., sodium phosphate, potassium phosphate, sodium triphosphate, potassium triphosphate, magnesium phosphate, calcium phosphate, etc. which can be beneficial for acting as an anticaking agent), carbonates or bicarbonates (e.g., sodium carbonate, sodium bicarbonate, potassium carbonate, potassium bicarbonate, etc.), nitrates (e.g., sodium nitrate, potassium nitrate, etc.), nitrites (e.g., sodium nitrite, potassium nitrite, etc.), sulfates or bisulfates (e.g., sodium sulfate, sodium bisulfate, potassium sulfate, etc.), sulfites or bisulphites (e.g., sodium sulfite, potassium sulfite, sodium bisulfite, sodium metabisulfite, potassium bisulfite, potassium metabisulfite, etc.), fatty acid salts (e.g., magnesium stearate), silicates (e.g., sodium silicate, calcium silicate, magnesium trisilicate, sodium aluminosilicate, potassium aluminium silicate, calcium aluminosilicate, aluminium silicate, polydimethylsiloxane, silicon dioxide, etc.), ferrocyanides (e.g., sodium ferrocyanide, potassium ferrocyanide, calcium ferrocyanide, etc.), and/or any suitable salt(s) can be used. However, any suitable nutritional additives can be used.

Colorants can function to modify a color or appearance of the formulation. For instance, colorants can be added to make a formulation match an expected color for a given product, for tracing, for holiday themes, to promote and/or discourage consumption, for cosmetic purposes, and/or can otherwise be used.

In some variants, the formulation can be tempered (e.g., heated to a target temperature for a predetermined amount of time), cycled (e.g., heated and cooled a predetermined number of times), purified (e.g., to remove free fatty acids, to remove a subset of triglycerides, etc.), and/or can otherwise be processed.

Figure 7A:
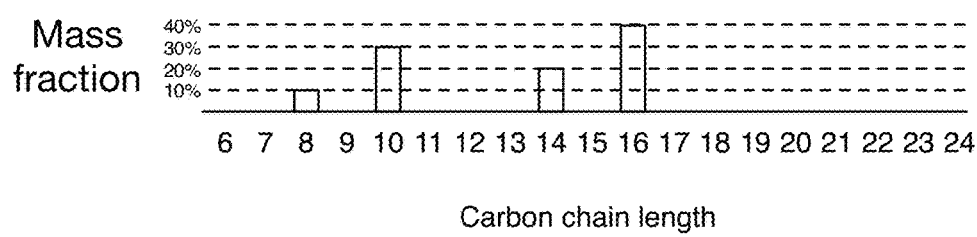
FIGS. 7A and 7B are schematic representations of exemplary even-only and even and odd formulations, respectively, for a beef fat substitute.

In a first illustrative example (as shown for instance in FIG. 7A), a formulation for a beef fat (e.g., beef tallow) can include about 10% (e.g., 7-15%) caprylic acid, about 30% (e.g., 25-35%) capric acid, about 20% (e.g., 0-60%) myristic acid, and about 40% (e.g., 0-60%) palmitic acid. The formulation can be a gapped formulation (e.g., excluding lauric acid). The fatty acids are preferably artificially manufactured, but can be naturally derived (e.g., recovered or sourced from plants, animals, fungi, microbial fermentation, etc.) and/or can otherwise be produced. In variations of the first illustrative example, the formulation preferably includes about 40% fatty acids with a chain length less than a threshold number of carbon atoms (e.g., fatty acids with a chain length shorter than a gap or an excluded fatty acid such as lauric acid in this illustrative example, fatty acids with a chain length less than about 12 carbon atoms, etc.) and about 60% fatty acids with a chain length greater than the threshold number of carbon atoms (e.g., fatty acids with a chain length longer than a gap or an excluded fatty acid such as lauric acid in this illustrative example, fatty acids with a chain length greater than 13 carbon atoms, etc.). In variations of this illustrative example, the fatty acids can be fully interesterified, the fatty acids can be interesterified with common fatty acids (e.g., fatty acids with chain length less than the threshold chain length can be interesterified, fatty acids with chain length greater than the threshold chain length can be interesterified, etc.), fatty acids can be interesterified with dissimilar fatty acids (e.g., one or more fatty acids with a chain length less than the threshold length can be interesterified with one or more fatty acids with a chain length greater than the threshold length), the fatty acids can form homotriglycerides (e.g., which can then be physically mixed), and/or the fatty acids can otherwise be esterified.

Figure 7B:
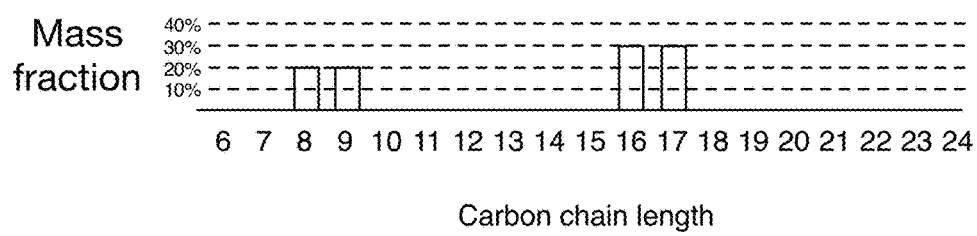

In a second illustrative example (as shown for instance in FIG. 7B), a formulation for a beef fat (e.g., beef tallow) can include about 20% (e.g., 0-40%) caprylic acid, about 20% (e.g., 0-40%) pelargonic acid, about 30% (e.g., 0-60%) palmitic acid, and about 30% (e.g., 0-60%) margaric acid. The formulation can be a gapped formulation (e.g., excluding capric, lauric, and/or myristic acid). The fatty acids are preferably artificially manufactured, but can be naturally derived (e.g., recovered or sourced from plants, animals, fungi, microbial fermentation, etc.) and/or can otherwise be produced. In variations of the second illustrative example, the formulation preferably includes about 40% fatty acids with a chain length less than a threshold number of carbon atoms (e.g., fatty acids with a chain length shorter than a gap or an excluded fatty acid such as capric, lauric, and/or myristic acid in this illustrative example, fatty acids with a chain length less than about 10 carbon atoms, etc.) and about 60% fatty acids with a chain length greater than the threshold number of carbon atoms (e.g., fatty acids with a chain length longer than a gap or an excluded fatty acid such as capric, lauric, and/or myristic acid in this illustrative example, fatty acids with a chain length greater than 15 carbon atoms, etc.). In variations of this illustrative example, the fatty acids can be fully or partially interesterified, the fatty acids can be interesterified with common fatty acids (e.g., fatty acids with chain length less than the threshold chain length can be interesterified, fatty acids with chain length greater than the threshold chain length can be interesterified, etc.), fatty acids can be interesterified with dissimilar fatty acids (e.g., one or more fatty acids with a chain length less than the threshold length can be interesterified with one or more fatty acids with a chain length greater than the threshold length), the fatty acids can form homotriglycerides (e.g., which can then be physically mixed), and/or the fatty acids can otherwise be esterified.

In a third illustrative example, a fat or lipid composition can include, consist, consisting essentially of, etc. triacylglycerides derived from saturated free fatty acids, wherein the saturated free fatty acids comprise a carbon chain length between four and twenty-four carbon atoms long, wherein the saturated free fatty acids exclude at least two saturated free fatty acids with sequential carbon chain lengths; and optionally one or more additives. In variations of the third illustrative example, the one or more additives of the composition can include a solvent, an emulsifier, a flavorant, a nutritional additive, a colorant, or an antioxidant. In variations of the composition of the third illustrative example, the triacylglycerides can consist essentially of even chain length fatty acids. In variations of the composition of the third illustrative example, the saturated free fatty acids can be manufactured by oxidizing paraffins. In variations of the composition of the third illustrative example, the triacylglycerides can include interesterified triacylglycerides (e.g., with a distribution of the interesterified triacylglycerides that can be substantially stochastic). In variations of the composition of the third illustrative example, the saturated free fatty acids can be linear.

In a fourth illustrative example, a composition (e.g., formulation, lipid formulation, fat analogue, etc.) can include at least 80% (e.g., by mass) triglycerides consisting of glycerol esterified with a first saturated fatty acid; a second saturated fatty acid; and a third saturated fatty acid. In variations of the fourth illustrative example, the first saturated fatty acid, the second saturated fatty acid, and the third saturated fatty acid can be linear. In variations of the fourth illustrative example, the first saturated fatty acid, the second saturated fatty acid, and the third saturated fatty acid can be not hydrogenated from cis-unsaturated fatty acids. In variations of the fourth illustrative example, the first saturated fatty acid, the second saturated fatty acid, and the third saturated fatty acid can each be selected from the group comprising: butanoic acid (e.g., C4:0), pentanoic acid (e.g., C5:0), hexanoic acid (e.g., C6:0), heptanoic acid (e.g., C7:0), octanoic acid (e.g., C8:0), nonanoic acid (e.g., C9:0), decanoic acid (e.g., C10:0), undecanoic acid (e.g., C11:0), dodecanoic acid (e.g., C12:0), tridecanoic acid (e.g., C13:0), tetradecanoic acid (e.g., C14:0), pentadecanoic acid (e.g., C15:0), hexadecenoic acid (e.g., C16:0), heptadecanoic acid (e.g., C17:0), octadecanoic acid (e.g., C18:0), nonadecanoic acid (e.g., C19:0), eicosanoic acid (e.g., C20:0), heneicosanoic acid (e.g., C21:0), docosanoic acid (e.g., C22:0), tricosanoic acid (e.g., C23:0), and tetracosanoic acid (e.g., C24:0). In variations of the fourth illustrative example, the first saturated fatty acid and the second saturated fatty acid can be different. In variations of the fourth illustrative example, the first saturated fatty acid, the second saturated fatty acid, and the third saturated fatty acid can each have an even carbon chain length. In variations of the fourth illustrative example, the fat composition can be a gapped formulation. In variations of the fourth illustrative example, the gapped formulation can exclude at least two (sequential) chain length fatty acids (e.g., with at least one set of fatty acids with chain length shorter than the excluded fatty acids and one set of fatty acids with chain length longer than the excluded fatty acids). In variations of the fourth illustrative example, the composition can include less than 5% of the excluded fatty acids. In variations of the fourth illustrative example, the composition can include an additive comprising at least one of an emulsifier, a flavorant, a nutritional additive, a colorant, and/or an antioxidant. In variations of the fourth illustrative example, the triglycerides can include interesterified triglycerides. In variations of the fourth illustrative example, the first saturated fatty acid, the second saturated fatty acid, and the third saturated fatty acid can each be manufactured by oxidizing paraffins, wherein the paraffins can be manufactured using a Fischer-Tropsch process. In variations of the fourth illustrative example, the composition can be used in a food product.

In a fifth illustrative example (as shown for instance in FIG. 9), a composition (e.g., a beef tallow functional analogue, beef tallow analogue, beef fat analogue, beef fat mimic, animal fat functional analogue, butterfat functional analogue, animal fat mimic, butterfat mimic, alternative animal fat, etc.) can include triglycerides wherein an approximate mass distribution of free fatty acids in the triglycerides is about: less than 5% butyric acid (e.g., C4:0); less than 5% valeric acid (e.g., C5:0); less than 5% caproic acid (e.g., C6:0); less than 5% enanthic acid (e.g., C7:0); between 2-15% caprylic acid (e.g., C8:0); between 0-15% pelargonic acid (e.g., C9:0); between 7-20% capric acid (e.g., C10:0); between 0-20% undecylic acid (e.g., C11:0); between 2-10% lauric acid (e.g., C12:0); between 0-10% tridecylic acid (e.g., C13:0); between 5-25% myristic acid (e.g., C14:0); between 0-25% pentadecylic acid (e.g., C15:0); between 7-25% palmitic acid (e.g., C16:0); less than 10% margaric acid (e.g., C17:0); less than 10% stearic acid (e.g., C18:0); less than 10% nonadecylic acid (e.g., C19:0); less than 10% arachidic acid (e.g., C20:0); less than 5% heneicosylic acid (e.g., C21:0); less than 5% behenic acid (e.g., C22:0); less than 5% tricosylic acid (e.g., C23:0); and less than 5% lignoceric acid (e.g., C24:0). In variations of the fifth specific example, the approximate mass distribution can be about 7.5% caprylic acid; about 7.5% pelargonic acid; about 12.5% capric acid; about 12.5% undecylic acid; about 25% myristic acid; about 25% pentadecylic acid; about 5% palmitic acid; and about 5% margaric acid. In variations of the fifth specific example, the approximate mass distribution can be about 8% caprylic acid; about 8% pelargonic acid; about 10% capric acid; about 10% undecylic acid; about 10% lauric acid; about 10% tridecylic acid; about 11% myristic acid; about 11% pentadecylic acid; about 11% palmitic acid; and about 11% margaric acid. In variations of the fifth specific example, the approximate mass distribution can be about 6% caprylic acid; about 6% pelargonic acid; about 16% capric acid; about 16% undecylic acid; about 5% lauric acid; about 5% tridecylic acid; about 23% palmitic acid; and about 23% margaric acid. In variations of the fifth specific example, the approximate mass distribution can be about 5% caprylic acid; about 5% pelargonic acid; about 15% capric acid; about 15% undecylic acid; about 10% myristic acid; about 10% pentadecylic acid; about 20% palmitic acid; about 20% margaric acid. In variations of the fifth specific example, the approximate mass distribution can be about 14% caprylic acid; about 14% pelargonic acid; about 4% lauric acid; about 4% tridecylic acid; about 18% myristic acid; about 18% pentadecylic acid; about 14% palmitic acid; and about 14% margaric acid. In variations of the fifth specific example, the approximate mass distribution can be about 15% capric acid; about 15% undecylic acid; about 5% lauric acid; about 5% tridecylic acid; about 5% myristic acid; about 5% pentadecylic acid; about 10% palmitic acid; about 10% margaric acid; about 10% stearic acid; about 10% nonadecylic acid; and about 10% arachidic acid. In variations of the fifth specific example, the approximate mass distribution can be about 2.5% caprylic acid; about 2.5% pelargonic acid; about 17.5% capric acid; about 17.5% undecylic acid; about 5% lauric acid; about 5% tridecylic acid; about 15% palmitic acid; about 15% margaric acid; about 7.5% stearic acid; about 7.5% nonadecylic acid; and about 5% arachidic acid.

In a sixth illustrative example (as shown for instance in FIG. 9), a composition (e.g., a beef tallow functional analogue, beef tallow analogue, beef fat analogue, beef fat mimic, animal fat functional analogue, butterfat functional analogue, animal fat mimic, butterfat mimic, alternative animal fat, etc.) can be a gapped formulation of interesterified triglycerides consisting essentially of saturated fatty acids, wherein the saturated fatty acids comprise carbon chain lengths between four and twenty carbon atoms long, wherein the gapped formulation can include a larger mass fraction of saturated fatty acids with chain lengths greater than the gap relative to saturated fatty acids with chain lengths less than the gap. In variations of the sixth specific example, the saturated fatty acids can consist essentially of even carbon chain lengths. In variations of the sixth specific example, the formulation can exclude at least two (e.g., at least two consecutive of) of capric acid, undecylic acid, lauric acid, tridecylic acid, myristic acid, and pentadecylic. In variations of the sixth specific example, the formulation can include at most about 40% by mass of fatty acids comprising fewer than a threshold number of carbon atoms and wherein the gapped formulation comprises at least about 60% by mass of fatty acids comprising greater than the threshold number of carbon atoms. In variations of the sixth specific example, the formulation can include about 10% (by mass, by volume, by stoichiometry, etc.) caprylic acid, about 30% (by mass, by volume, by stoichiometry, etc.) capric acid, about 20% (by mass, by volume, by stoichiometry, etc.) myristic acid, and about 40% (by mass, by volume, by stoichiometry, etc.) palmitic acid. In variations of the sixth specific example, the formulation can include about 20% (by mass, by volume, by stoichiometry, etc.) caprylic acid, about 20% (by mass, by volume, by stoichiometry, etc.) pelargonic acid, about 30% (by mass, by volume, by stoichiometry, etc.) palmitic acid, and about 30% (by mass, by volume, by stoichiometry, etc.) margaric acid.

Figure 10:
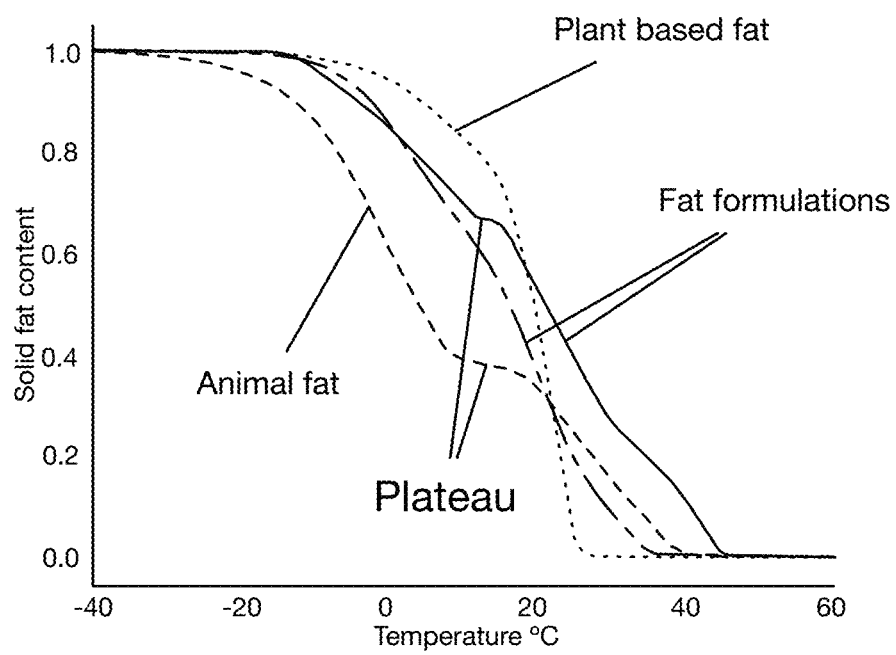
FIG. 10 is a graphical representation of exemplary solid fat content as a function of temperature for exemplary formulations, an animal fat (e.g., beef tallow), and a plant derived fat (e.g., coconut oil, fat formulation made by combining fats from plants, etc.).

In a seventh illustrative example, a composition (e.g., a beef tallow functional analogue, beef tallow analogue, beef fat analogue, beef fat mimic, animal fat functional analogue, butterfat functional analogue, animal fat mimic, butterfat mimic, alternative animal fat, etc.) can be lipids consisting of (e.g., composed of, including only, etc.) saturated fatty acids; a melting point greater than about 30° C.; and wherein a solid fat content of the composition changes from about 0.8 to about 0.2 over a temperature span of between about 20° C. and 30° C. In variations of the seventh specific example, the formulation can have a solid fat content of about 0.5 at a temperature between 15° C. and 25° C. In variations of the seventh specific example, the solid fat content can be determined using corrected differential scanning calorimetry. In variations of the seventh specific example, the solid fat content of the composition can include a plateau (e.g., a region of the SFC curve that does not significantly change such as changes by less than a threshold amount such as 0.1%, 0.5%, 1%, 2%, 5%, etc. over a temperature span such as 0.5° C., 1° C., 2° C., 5° C., 10° C., etc.; a first derivative that is approximately 0 such as less than 1%/° C., a second derivative that is approximately 0, a second derivative that changes sign while the first derivative is approximately 0, etc.; as shown for example in FIG. 10; etc.). In variations of the seventh specific example, the formulation can include a distribution of triglycerides formed by interesterifying a plurality of free saturated fatty acids with glycerol. In variations of the seventh specific example, the formulation can include a plurality of free saturated fatty acids that include (e.g., include only) even chain fatty acids with chain lengths between four carbon atoms and twenty carbon atoms in length.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An animal fat mimic consisting of:
   lipids consisting of saturated fatty acids;
   wherein a melting point of the animal fat mimic is greater than about 30° C.; and
   wherein a solid fat content of the animal fat mimic changes from about 0.8 to about 0.2 over a temperature span of between about 20° C. and 30° C.

2. The animal fat mimic of claim 1, wherein the solid fat content is about 0.5 at a temperature between 15° C. and 25° C.

3. The animal fat mimic of claim 1, wherein the solid fat content of the animal fat mimic comprises a plateau that persists for at least a temperature span of 5° C.

4. The animal fat mimic of claim 1, wherein the lipids comprise a stochastic distribution of triglycerides.

5. The animal fat mimic of claim 4, wherein the plurality of free saturated fatty acids comprise even chain fatty acids with chain lengths between four carbon atoms and twenty carbon atoms in length.

6. The animal fat mimic of claim 1, wherein the saturated fatty acids comprise odd carbon chain lengths.

7. The animal fat mimic of claim 6, wherein the saturated fatty acids comprise at least 5% odd carbon chain lengths by mass.

* * * * *